United States Patent [19]

Cazort et al.

[11] Patent Number: 5,462,140
[45] Date of Patent: Oct. 31, 1995

[54] ACCELERATION SENSITIVE SHOCK ABSORBER

[75] Inventors: J. Guy Cazort, Corona Del Mar; Donald G. Richardson, Jackson, both of Calif.

[73] Assignee: Richardson Technologies, Ltd., Jackson, Calif.

[21] Appl. No.: 878,850

[22] Filed: May 5, 1992

[51] Int. Cl.⁶ .................................................. F16F 9/34
[52] U.S. Cl. ................................. 188/275; 188/315
[58] Field of Search .......................... 188/275, 314, 188/315, 316, 280, 285, 286, 287

[56] References Cited

U.S. PATENT DOCUMENTS

| | | | |
|---|---|---|---|
| 1,281,079 | 10/1918 | Sears . | |
| 2,140,359 | 12/1938 | Hanna | 188/88 |
| 2,252,772 | 8/1939 | Katcher | 188/275 |
| 2,329,803 | 10/1941 | Whisler, Jr. | 188/275 |
| 2,431,966 | 12/1947 | Rossman | 188/275 |
| 3,168,168 | 2/1965 | Chorkel | 188/287 |
| 3,338,347 | 8/1967 | Avner | 188/88 |
| 3,414,092 | 12/1968 | Speckhart | 188/100 |
| 4,796,732 | 1/1989 | Kong | 188/315 |
| 4,917,222 | 4/1990 | Bacardit | 188/275 |
| 4,958,706 | 9/1990 | Richardson et al. | 188/275 |

FOREIGN PATENT DOCUMENTS

| | | |
|---|---|---|
| 294846 | 9/1966 | Australia . |
| 1165327 | 1/1957 | France . |
| 1175195 | 5/1957 | France . |
| 1006819 | 7/1983 | U.S.S.R. . |
| 737486 | 9/1955 | United Kingdom . |
| 794354 | 4/1958 | United Kingdom . |
| 1593258 | 7/1981 | United Kingdom . |

*Primary Examiner*—Matthew C. Graham
*Attorney, Agent, or Firm*—Christie, Parker & Hale

[57] ABSTRACT

A twin tube shock absorber has concentric inner and outer tubes connected to the wheel of a vehicle. A piston in the inner tube is connected to the chassis of the vehicle and divides the interior of the inner tube into upper and lower chambers. Fluid passes between these chambers and an annular reservoir between the tubes for absorbing shock in a conventional manner. An orifice is provided through the sidewall of the lower portion of the inner tube and is surrounded by a lower sleeve, which normally keeps the orifice closed. Upon upward acceleration of the tubes, the sleeve essentially remains fixed in space. The relative movement between the sleeve and tubes aligns a passage through the sleeve with the orifice and permits fluid to flow from the lower chamber below the piston to the annular reservoir. This provides a softer shock absorber when high upward acceleration is felt by the tubes of the shock absorber and a stiffer shock absorber during times when there is no large upward acceleration. A similar orifice and sleeve are provided at the upper end of the inner tube for permitting fluid to flow from the upper chamber into the reservoir during rapid downward acceleration of the tubes. The orifices are spaced apart from the ends of the inner tube so that when the piston passes an orifice, the characteristics of the shock may change from soft to stiff before the end of the stroke of the piston.

28 Claims, 3 Drawing Sheets

NO ACCELERATION

ACCELERATION SENSITIVE SHOCK ABSORBER

BACKGROUND

This invention relates to vehicle shock absorbers typically mounted between the wheels and frame of an automobile, truck, motorcycle, etc. The invention relates to a shock absorber with damping characteristics that change depending on the acceleration of parts of the shock absorber.

This application is related to U.S. patent application Ser. No. 07/798,036, filed Nov. 20, 1991.

Hydraulic shock absorbers are universally employed in automotive vehicles. Each wheel of the vehicle is coupled to the frame by a spring so that bumps or dips in the road are not transmitted directly to the passengers or vehicle lead. A spring alone, however, would still give a rough ride. Shock absorbers are therefore mounted in parallel with the springs to damp the accelerations applied to the frame from the wheel. There is a long history of shock absorber development to obtain desired characteristics of passenger ride, comfort, handling for steering, road traction and the like.

Most shock absorbers are designed to have a certain operating characteristic or load-velocity curve which is a compromise of the characteristics desired for a variety of road conditions. The characteristics suitable for driving on relatively smooth road may, however, be inappropriate where the vehicle wheels may encounter short range bumps or dips. Such conditions are not limited to vehicles like those used on off-road terrain, but also include ordinary passenger and freight vehicles which may unexpectedly encounter chuck holes, speed bumps or foreign objects on the roadway.

Efforts have therefore been made to provide shock absorbers with variable characteristics in response to varying road conditions. Attempts to have been made to have computer controlled shock absorbers employing sensors, solid state computers which are preprogrammed, and electrically operated valves controlled by the computer. As with any computer, its output is no better than its input and even though the speed of response is indeed amazing, the overall system response, including that of the mechanical valves, determines the actual speed of adjustment.

A vehicle traveling at about 100 km/h advances over the ground approximately 16 centimeters in five milliseconds. A computer controlled system which has an overall response time in that range cannot provide effective compensation for surface conditions based on any remote sensing of either present or anticipated road conditions. The acceleration of the wheel upon hitting a bump or dip may be over before the system can adequately respond. Furthermore, by directing optical or other sensors ahead of the vehicle, the sensors incur problems of dust, rain or other conditions which may mask the true road condition and prevent effective computer controlled compensation.

Another approach is to employ acceleration responsive valves which require no computer or manual adjustment. A number of acceleration responsive shock absorbers have been proposed which internally respond to accelerations for providing automatic adjustment of orifices in the shock absorbers. Many of these systems are limited since they provide no reduction in rebound resistance or resistance to extension of the shock absorber in the presence of terrain defects, particularly, sharp dips.

There are two principal types of shock absorbers employed on automotive vehicles. One of them comprises a single tube or cylinder with a piston in the cylinder. A variety of valves and orifices are used for controlling flow of hydraulic shock absorber fluid from one end of the cylinder to the other end through the piston. A variety of acceleration sensitive adjustments have been proposed for this type of shock absorber.

The other principal type of shock absorber has twin tubes. In this type of shock absorber there are concentric tubes with a piston in the inner tube. The annulus between the inner and outer tubes serves as a reservoir for hydraulic fluid and may serve as a pressure accumulator. Sometimes such shock absorbers may be connected to an external pressure accumulator. No efforts are known with respect to providing an acceleration sensitive twin tube shock absorber.

It is also desirable that such an acceleration sensitive shock absorber have essentially instantaneous changes in characteristics when subjected to acceleration in either compression or extension. It is also desirable that the shock absorber include means for assuring a change of characteristics near the end of the stroke of the shock absorber so that the piston does not "bottom" against a hard metal end.

BRIEF SUMMARY OF THE INVENTION

There is, therefore, provided in practice of this invention according to a presently preferred embodiment an acceleration sensitive shock absorber having an outer tube and an inner tube fixed within the outer tube to define an annular reservoir between the tubes for shock absorber fluid. A piston is sealed within the inner tube and connected to a shaft which extends out of the shock absorber. The outer tube is connected to a portion of the vehicle, generally the wheel, and the shaft is connected to another portion of the vehicle, generally the chassis. The piston divides the inner tube into an upper chamber and a lower chamber and means are provided for passing shock absorber fluid between the two chambers. A normally closed valve is located in the annular reservoir for opening and increasing the flow of fluid from one of the chambers into the reservoir in the event of a vertical acceleration of the tubes at a rate exceeding a preselected magnitude.

Preferably the valve comprises at least one orifice through the side wall of the inner tube and a movable sleeve surrounding the tube in the portion containing the orifice for opening the orifice upon acceleration of the tubes.

A row of orifices at differing distances from the end of the tube may be used. As the piston passes such an orifice or orifices, flow through the orifice is stopped. Thus, when the acceleration exceeds some predetermined magnitude, the shock absorber has a soft or low resistance mid-portion of its stroke and a stiffer or higher resistance portion at the end before the piston strikes the end of the shock absorber.

BRIEF DESCRIPTION OF THE DRAWINGS

These and other features and advantages of the present invention will be better understood by reference to the following detailed description when considered in connection with the accompanying drawings of a twin tube acceleration sensitive shock absorber constructed according to principles of this invention wherein.

DETAILED DESCRIPTION

Figure 1:
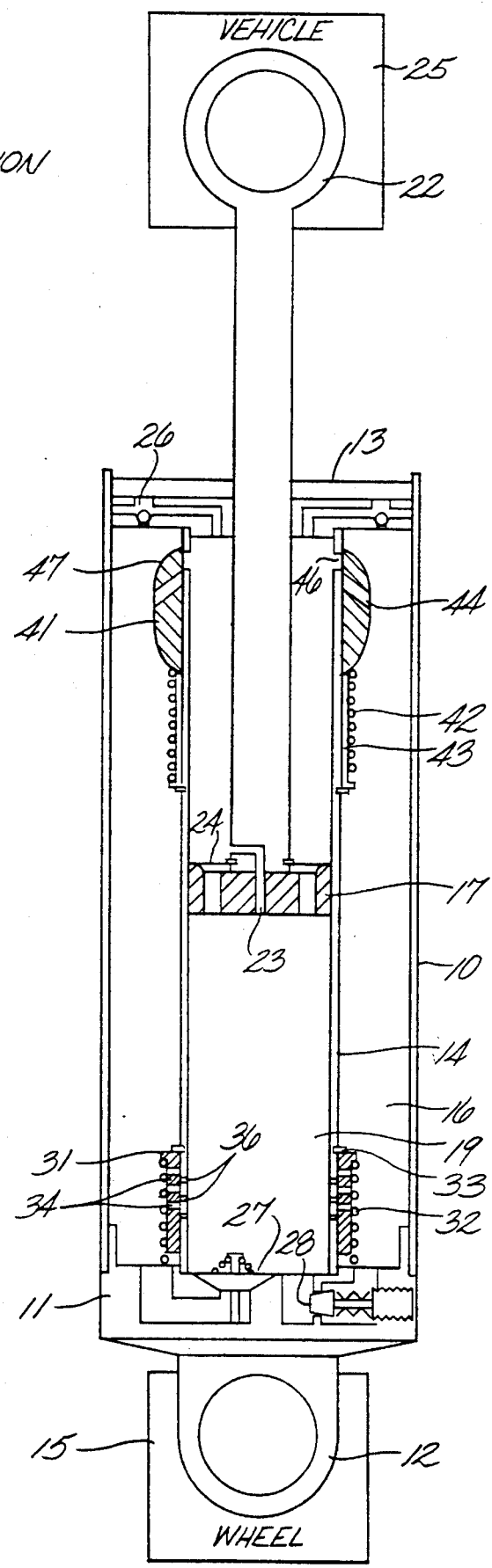
FIG. 1 illustrates the shock absorber schematically in longitudinal cross section when there is no acceleration of the shock absorber.

A representative shock absorber as illustrated semi-schematically in the drawings has an outer tube 10 sealed at its lower end by a lower end cap 11 having a conventional fitting 12 for bolting the end cap to a the mounts for vehicle wheel 15. The upper end of the outer tube is sealed by an upper end cap 13. An inner tube 14 is also sealed to both the upper and lower end caps. This defines an annular fluid reservoir 16 between the inner and outer tubes.

The shock absorber is illustrated in the drawings with the lower end cap at the bottom since this is the way of connecting the shock absorber to a vehicle. The fitting is bolted to the wheel assembly 15 in a conventional manner.

A movable piston 17 is sealed in the inner tube, dividing its interior into an upper chamber 18 and lower chamber 19. The piston is connected to a shaft 21 which extends through the upper end cap and terminates in a fitting 22 which is used for bolting the shaft to a vehicle chassis 25, for example. In the drawings, various seals (such as a seal around the shaft), threaded connections and the like are not illustrated since they are not required for an understanding of this invention and are conventional features well known to those skilled in the art.

The piston has an orifice 23 for metered fluid flow between the upper and lower chambers. In a typical embodiment, the piston also includes a disk-type check valve 24 for permitting fluid to flow from the lower chamber to the upper chamber, and preventing fluid flow from the upper chamber to the lower chamber. The piston and check valve are conventional in twin tube shock absorbers, although not all shock absorbers have such a check valve or they may use other types of check valves.

The shock absorber may include three additional check valves to provide fluid flow between the annular reservoir between the tubes and the chambers in the inner tube. For example, in the upper end cap there may be a check valve 26 which permits fluid to flow from the annular reservoir into the upper chamber, and prevents flow from the upper chamber into the reservoir.

What is commonly known as a foot valve 27 is provided in the lower end cap. The foot valve is a large-area check valve which permits fluid to flow from the reservoir into the lower chamber, and prevents flow from the lower chamber into the reservoir. In some embodiments of shock absorber, the foot valve is replaced by a fluid passage which meters flow in either direction between the reservoir and lower chamber.

An adjustable pressure relief valve 28 is arranged to permit fluid flow from the lower chamber into the annular reservoir and prevent reverse flow. The pressure relief valve has a rather high opening force, and is provided to release fluid displaced as the piston shaft moves downwardly.

In principle, the shock absorber described to this point is conventional. It is merely exemplary of a twin tube shock absorber. Some of these features may be deleted in specific embodiments, and other features may be present which are commonly found in shock absorbers. For example, an external pressure accumulator may be connected to the annular reservoir for maintaining pressure in the shock absorber and accommodating fluid displaced by the piston. Likewise, a closed-cell foam (not illustrated) may be included in the reservoir to act as an internal pressure accumulator to accommodate pressure changes as the piston shaft displaces fluid.

The shock absorber responds at zero or low acceleration as a conventional shock absorber. Thus, if the vehicle is forced downwardly by cornering or braking, for example, causing the piston to move downwardly relative to the tubes, fluid flows through the orifice 23 and check valve 24 in the piston from the lower chamber to the upper chamber. The pressure relief valve 28 opens to release fluid displaced by the shaft 21 entering the upper chamber. Restricted flow through the orifice and valves limits the rate of compression of the shock absorber. During compression fluid flows rather readily through the piston to avoid cavitation in the upper chamber. Metering of fluid flow through the pressure relief valve to limit movement of fluid displaced by the piston shaft provides the principal resistance to compression.

When the compression is relieved and the vehicle rebounds, fluid flows from the reservoir through the foot valve into the lower chamber, and from the upper chamber into the lower chamber through the piston orifice. The rebound force on the piston comes from the vehicle spring (not shown), and in some cases from gas pressure, in a conventional manner.

In the event the wheel extends from a mid-range position at a very low acceleration, such as when the road surface gradually drops away, the shock absorber expands in essentially the same way as when the vehicle is rebounding.

Assume, however, that the wheel hits a bump or foreign object in the road. This drives the tubes upwardly with rapid acceleration. It is desirable under those circumstances to have the shock absorber suddenly become "softer" so that the impact of the bump is alleviated and less shock is transmitted to the body of the vehicle. For this purpose, a normally closed valve 31 opens for increasing the flow of fluid from the lower chamber 19 into the annular reservoir.

Figure 2:
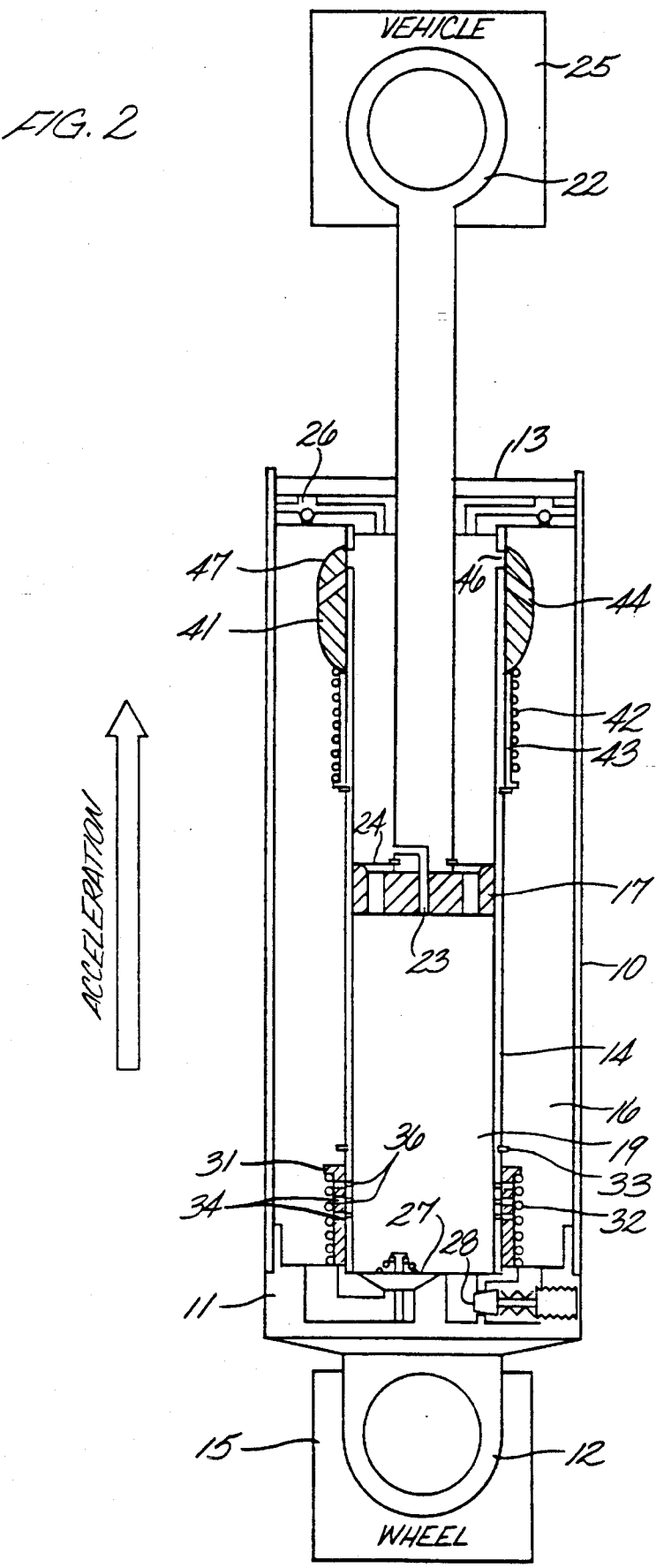
FIG. 2 illustrates the shock absorber in longitudinal cross section as the tubes accelerate longitudinally toward the rod shaft end or away from the ground.

This effect is illustrated in the longitudinal cross section of FIG. 2. A lower movable sleeve 31 in the reservoir surrounds the inner tube. The lower sleeve is supported by a spring 32 which at least supports the weight of the sleeve and holds it against a stop ring 33 at the top of the sleeve. When the tubes accelerate upwardly, the inertia of the lower sleeve leaves it essentially immovable in space, and the tubes move upwardly relative to the sleeve until the sleeve reaches the lower end cap in a position as illustrated in FIG. 2.

When the sleeve reaches this position, a row of passages 34 through the sleeve align with a row of lower orifices 36 through the side wall of the inner tube. This alignment permits fluid to flow from the lower chamber into the annular reservoir, thereby permitting the tubes to travel faster relative to the piston. This permits the wheel to move quickly relative to the vehicle for alleviating the shock transmitted to the vehicle.

When the wheel acceleration diminishes below a predetermined value, the spring causes the lower sleeve to return to its normally closed position against the stop, thereby closing the orifice and returning the shock absorber to its normally stiffer characteristic. Thus, in the event the wheel hits a raised bump or object in the roadway, the rapid acceleration causes the shock absorber to temporarily become soft for minimizing the shock transmitted to the vehicle body, while under normal road conditions the shock is relatively stiff for good handling.

It may also be noted that the lower orifices 36 through the side wall of the inner tube are spaced above the bottom of the tube. This assures that in the event of an extreme compression of the shock absorber, its characteristic of being soft does not continue for the full stroke; but instead, when the piston passes the orifices, the shock absorber again becomes stiff before the end of the stroke is reached. In this embodiment, three orifices at different distances from the end of the stroke are used (with suitable passages through the lower sleeve) so that the shock absorber becomes progressively stiffer near the end of the stroke as less and less fluid can flow through the orifices.

It is also desirable that the shock absorber respond with different characteristics if a wheel drops away suddenly from the vehicle body. This may occur for example, if the wheel encounters a chuckhole, or it may occur immediately following shock absorber compression as the wheel passes over a bump or object in the road. It can be quite desirable under those conditions for the wheel to rapidly move toward the road surface with minimum inhibition by a stiff shock absorber since this enhances road traction. It is undesirable that the shock of such rapid wheel movement be transmitted to the vehicle, passengers or load.

Normally closed valve means are also provided for changing the stiffness of the shock absorber upon rapid downward acceleration of the tubes. For this purpose, a movable upper sleeve 41 surrounds the inner tube near its upper end. A significant portion of the weight of the upper sleeve is supported by a low spring rate coil spring 42. During normal use of the shock absorber on a reasonably smooth road, the upper sleeve rests on a stop sleeve 43 inside the coil spring. The upper sleeve includes a radial fluid passage 44.

Figure 3:
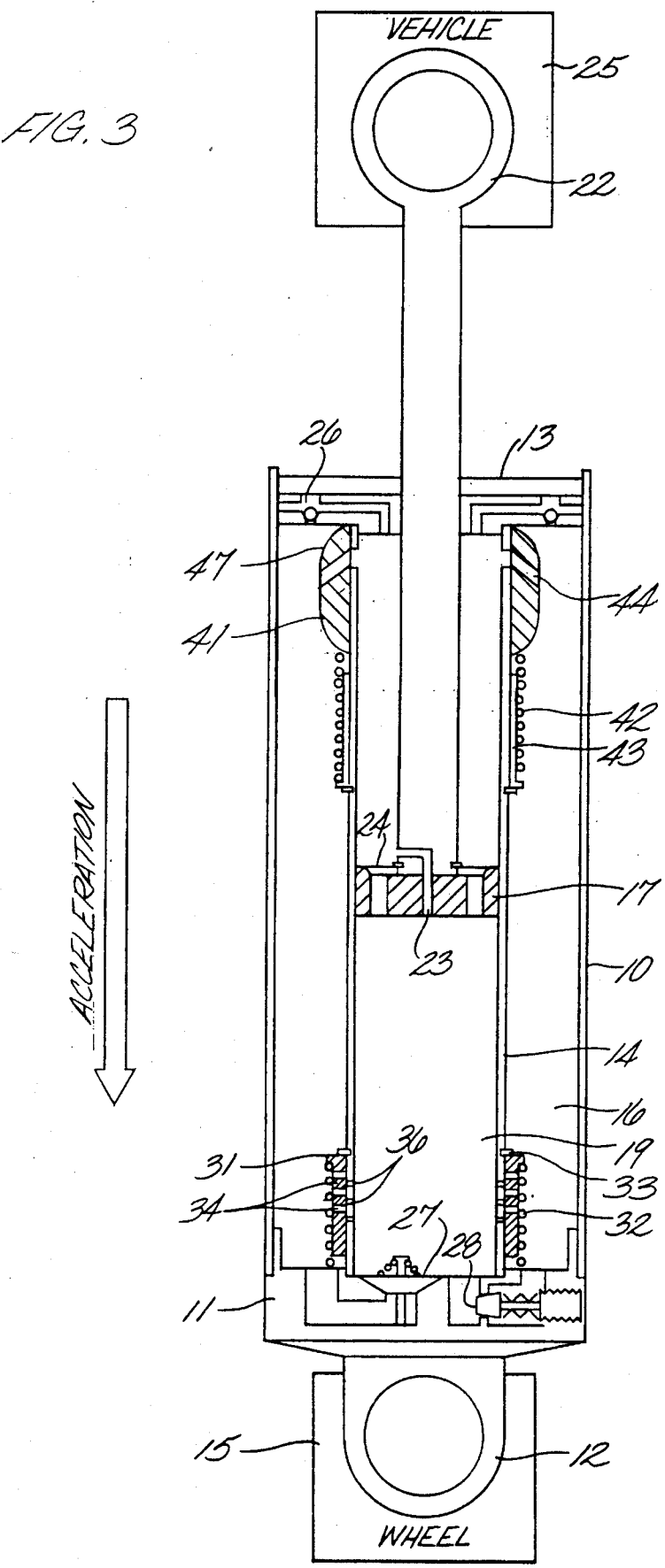
FIG. 3 illustrates the shock absorber when the tubes are accelerating away from the shaft end or toward the ground.

In the event of rapid downward acceleration of the shock absorber tubes at more than a predetermined magnitude, the upper sleeve essentially remains fixed in space due to its inertia, and the tubes move away from the sleeve until the sleeve reaches the upper end cap as illustrated in FIG. 3. In this position, the passage through the upper sleeve aligns with an upper orifice 46 through the side wall of the inner tube near its upper end. This permits fluid to flow rapidly from the upper chamber 18 into the annular reservoir between the tubes. This relatively large orifice permits rapid extension of the shock absorber for outstanding rebound characteristics and accommodation of chuckholes, or the like, without transmitting significant shock loading to the vehicle.

The spring 42 for the upper sleeve is optional. By supporting a significant portion of the weight of the sleeve, the sensitivity of the shock absorber to low magnitudes of acceleration is improved. It is found, however, that the upper sleeve valving for the extension stroke of the shock absorber works without a spring. The spring 32 supporting the lower sleeve for compression valving is important for maintaining the sleeve against the stop.

The upper orifice is also spaced apart from the upper end cap so that the piston passes the upper orifice before the piston reaches the end of its stroke, thereby, increasing the stiffness near the end of the stroke. The distance of the orifice from the end of the stroke for extension can be appreciably less than for compression, since the violence of extension tends to be less than that of compression.

It is often desirable during rebound or extension for the shock absorber to remain soft after acceleration has decreased below the magnitude that caused the orifice valve to open. The passages 44 through the upper sleeve are therefore angled downwardly and outwardly so that fluid flowing from the upper chamber into the reservoir is deflected downwardly and the sleeve is, therefore, biased upwardly. This tends to hold the orifice valve open after the acceleration has decreased beyond the magnitude that originally opens the valve and the valve remains open while fluid flow continues during shock absorber extension. Such an arrangement also assists in preventing "chatter" when the orifice is only partly open.

Providing orifices through the side wall of the inner tube in positions where they may be closed by passage of the piston provides the shock absorber with the capability of being soft (under appropriate accelerations), in a mid-portion of the stroke and stiff near each end of the stroke, this capability minimizes the shock that may be transmitted to the vehicle upon "bottoming" of a shock absorber. This capability is not readily available in shock absorbers which have variable characteristics due to valving mounted in the piston.

The actual characteristics desired in the shock absorber vary considerably depending on the application of the shock absorber. Thus, it will be apparent that different characteristics would be employed for shock absorbers used on motorcycles, light automobiles, heavy automobiles, light trucks and heavy trucks. There are a large number of design and dimensional changes which can be made in the shock absorber to accommodate these differing applications. Some of these are conventionally controlled in shock absorbers, such as orifice dimensions, check valve dimensions, check valve opening forces, piston diameter, piston stroke and the like.

In addition, in an acceleration sensitive shock absorber, one may vary the normally closed orifice sizes and locations for changing the characteristics of the shock absorber. The acceleration at which the characteristics change can be varied by changes in the weight of the sliding sleeves and the spring constants of the springs that support a significant portion of the weight of the sleeve. In fact, if desired, the characteristics of the shock absorber may be changed after manufacture by providing means for adjusting springs or orifice sizes from outside the shock absorber.

It might be noted that the mass of the acceleration sensitive valve in a shock absorber as described herein can be appreciably greater than where the acceleration sensitive valve is located in the piston. In this arrangement, the sleeve can be relatively thick and long to obtain a desired mass, since there is ample space in the annular reservoir for accommodating the sleeve. Space is much more limited in the piston. Thus, any desired sensitivity may be obtained.

The sensitivity may be affected by fluid drag on the movable sleeves, thus streamlining in the form of rounded ends 47 may be provided on one or more of the sleeves for minimizing this effect.

An exemplary automotive shock absorber has a tube length in the order of 25 cm and a diameter of about 5 cm. The diameter of the inner tube is about 3 cm. In such an embodiment, a typical lower orifice comprises two rows of three drilled holes about 1.5 millimeters in diameter. The upper orifice is appreciably larger, and the collective area of several holes drilled through the side wall of the inner tube is equivalent to the cross section of a round hole about 12 millimeters in diameter. Several holes about 2.5 millimeter diameter are typically used for virtually unrestricted fluid flow upon rapid acceleration. Larger orifices give a softer shock absorber and smaller holes give a stiffer shock absorber.

The clearance between the sleeves and the inner tube should be sufficient that fluid shear in the clearance does not substantially retard the relative displacement between the tube and sleeve, yet the clearance must be small enough that the orifices are closed when the sleeve is over them. A clearance of about 130 microns appears to be sufficient. The sleeve should also be sufficiently long relative to the diameter of the tube that it will not cock and can move freely.

It will be recognized that the shock absorber, illustrated herein, is semi-schematic and that some features are omitted for clarity. For example, the piston seal is omitted. A circumferential recess in the sleeve adjacent to the passages is also not shown. This is used as a fluid passage so that it is not necessary to keep the sleeve passages aligned with the orifices through the tube wall when the respective valves are open.

It will also be apparent that the actual construction may differ from the illustration. For example, stop rings for the sleeves may not be practical in small size shock absorbers, since the wall thickness of the inner tube may be too thin for a groove to receive the stop ring. Thus, the stop ring 33 and sleeve 43 may be in the form of shoulders on the outside of a machined tube.

It will also be apparent that there may be many modifications, variations and embellishments of the shock absorber. As suggested above, some of the check valves may be omitted or replaced by passages in specific embodiments. The shape of the orifices through the side wall of the inner tube and the corresponding passages through the sleeves may be varied or chamfers provided so that the change between stiff and soft characteristics of the shock absorber change at a controlled rate.

The interior of each sleeve may be provided with a circumferential groove so that the passages need not be aligned with the orifices through the wall of the tube. Instead of passages through the sleeves, the inside of the sleeve may be enlarged or counterbored nearer one end so that fluid can flow longitudinally between the sleeve and inner tube wall when the orifices are not covered by the closer fitting portion of the sleeve. In effect, this is a passage through the sleeve, but discharging at an end of the sleeve. Such a counterbore can also serve to direct fluid flow in a direction that keeps the normally closed valve in its open position.

If desired, different degrees of stiffness may be provided for different acceleration rates. It may be desirable to have a somewhat soft shock absorber for mild accelerations and a considerably softer shock absorber for severe accelerations. Such performance may be achieved by employing a pair of concentric sleeves around the inner tube. One of the sleeves, has a suitable mass and spring so that it displaces a sufficient distance to open one set of orifices at a relatively lower magnitude of acceleration. The other sleeve has a sufficient mass and spring constant for opening another orifice at a higher acceleration. Thus, at low acceleration, fluid may flow through one orifice and at higher accelerations, may flow through both orifices for a softer effect.

Since there are many such modifications and variations, which will be apparent to those skilled in the art, it is to be understood that the invention may be practiced, otherwise than as specification described.

What is claimed is:

1. An acceleration sensitive shock absorber comprising:
   an outer tube;
   means for connecting the outer tube to a portion of a vehicle;
   an inner tube fixed within the outer tube defining an annular reservoir between the inner and outer tubes for shock absorber fluid;
   a piston sealed within the inner tube and connected to a shaft extending out of the shock absorber, the shaft including means for connecting the shaft to another portion of the vehicle, the piston dividing the inside of the inner tube into an upper chamber and a lower chamber;
   means for passing fluid between the upper and lower chambers and the reservoir upon compression or extension of the shock absorber;
   an orifice through the sidewall of the inner tube adjacent one of the chambers; and
   a movable sleeve in the reservoir surrounding the portion of the inner tube containing the orifice for opening the orifice upon acceleration of the tubes in one longitudinal direction and increasing flow of fluid from one of the chambers into the reservoir in the event of longitudinal acceleration of the shock absorber tubes at more than a preselected magnitude.

2. An acceleration sensitive shock absorber as recited in claim 1 wherein the piston is connected to a vehicle and the outer tube is connected to a wheel of the vehicle.

3. An acceleration sensitive shock absorber as recited in claim 1 wherein the orifice is spaced apart from the end of the stroke of the piston for closing the orifice before the end of the stroke.

4. An acceleration sensitive shock absorber as recited in claim 1 wherein the means for passing fluid comprises:
   an orifice through the piston; and
   a check valve on the piston for passing fluid from the lower chamber to the upper chamber.

5. An acceleration sensitive shock absorber as recited in claim 1 comprising:
   a plurality of orifices through the sidewall of the inner tube at differing distances from the end of the tube.

6. An acceleration sensitive shock absorber as recited in claim 1 wherein the orifice comprises:
   a lower orifice through the sidewall of the inner tube near the bottom of the inner tube; and
   the movable sleeve surrounds a lower portion of the inner tube for opening the lower orifice through the sidewall of the inner tube upon upward acceleration of the shock absorber at more than a preselected magnitude.

7. An acceleration sensitive shock absorber as recited in claim 6 wherein the lower orifice is spaced apart from the end of the inner tube so that the piston closes the orifice before the end of the stroke.

8. An acceleration sensitive shock absorber as recited in claim 1 wherein orifice comprises:
   an upper orifice through the sidewall of the inner tube near the top of the inner tube; and
   the movable sleeve surrounds an upper portion of the inner tube for opening the upper orifice through the sidewall of the inner tube upon downward acceleration of the shock absorber at more than a preselected magnitude.

9. An acceleration sensitive shock absorber as recited in claim 8 wherein an end of the upper sleeve is streamlined for minimizing fluid drag on the sleeve.

10. An acceleration sensitive shock absorber as recited in claim 8 wherein the sleeve comprises a passage extending radially outwardly and downwardly for deflecting fluid flow through the orifice downwardly.

11. An acceleration sensitive shock absorber as recited in claim 1 wherein the orifice is spaced apart from the end of the inner tube so that the piston closes the orifice before the end of the stroke.

12. An acceleration sensitive shock absorber as recited in claim 1 further comprising means for biasing the movable sleeve toward a position with the orifice open in response to fluid flow through the orifice.

13. An acceleration sensitive shock absorber comprising:

an outer tube;

means for connecting the outer tube to a wheel on a vehicle;

an inner tube within the outer tube defining an annular reservoir for shock absorber fluid between the inner tube and the outer tube;

a piston sealed within the inner tube and connected to a shaft extending out of the shock absorber, the shaft including means for connecting the shaft to the vehicle, the piston dividing the inside of the inner tube into an upper chamber and a lower chamber;

a passage through the piston for passing fluid between the upper and lower chambers;

a check valve on the piston for passing fluid from the lower chamber to the upper chamber;

a foot valve assembly at the bottom of the shock absorber comprising:

means for passing fluid from the annular reservoir to the lower chamber, and a pressure relief valve for passing fluid from the lower chamber to the annular reservoir;

a check valve at the top of the shock absorber for passing fluid from the annular reservoir to the upper chamber;

an orifice through a lower sidewall of the inner tube spaced apart from the foot valve assembly;

a compression sleeve surrounding the lower sidewall of the inner tube and movable between a lower position and an upper position; and a passage through the compression sleeve positioned for non-alignment with the orifice through the lower sidewall when the compression sleeve is in the upper position and for alignment with the passage through the lower sidewall when the compression sleeve is in the lower position.

14. An acceleration sensitive shock absorber as recited in claim 13 wherein the piston shaft has a sufficient length that the sealed piston passes the orifice through the lower sidewall before reaching the end of the compression stroke of the piston.

15. An acceleration sensitive shock absorber as recited in claim 13 further comprising:

an upper orifice through an upper sidewall of the inner tube;

an extension sleeve surrounding the upper sidewall of the inner tube and movable between a lower position and an upper position; and a passage through the extension sleeve positioned for non-alignment with the orifice through the upper sidewall when the extension sleeve is in the lower position and for alignment with the orifice through the upper sidewall when the extension sleeve is in the upper position.

16. An acceleration sensitive shock absorber as recited in claim 13 wherein the orifice comprises a plurality of orifices through a sidewall of the inner tube at differing distances from the end of the tube.

17. An acceleration sensitive shock absorber as recited in claim 13 further comprising:

a stop above the compression sleeve; and a spring biasing the compression sleeve upwardly for counteracting at least the weight of the compression sleeve and maintaining the compression sleeve against the stop in the absence of upward acceleration.

18. An acceleration sensitive shock absorber comprising:

an outer tube;

an inner tube within the outer tube defining an annular reservoir for shock absorber fluid between the inner tube and the outer tube;

a piston sealed within the inner tube and connected to a shaft extending out of the shock absorber, the shaft including means for connecting the shaft to a vehicle, the piston dividing the inside of the inner tube into an upper chamber and a lower chamber;

means for connecting the outer tube to a wheel on the vehicle;

a passage through the piston for passing fluid between the upper and lower chambers;

a check valve on the piston for passing fluid from the lower chamber to the upper chamber;

a foot valve assembly comprising;

means for passing fluid from the annular reservoir to the lower chamber, and a pressure relief valve for passing fluid from the lower chamber to the annular reservoir;

a check valve at the top of the shock absorber for passing fluid from the annular reservoir to the upper chamber;

an orifice through an upper sidewall of the inner tube;

an extension sleeve surrounding the upper sidewall of the inner tube and movable between a lower position and an upper position; and a passage through the extension sleeve positioned for non-alignment with the orifice through the upper sidewall when the extension sleeve is in the lower position and for alignment with the orifice through the upper sidewall when the extension sleeve is in the upper position.

19. An acceleration sensitive shock absorber as recited in claim 18 further comprising means for retaining the extension sleeve in the upper position when pressure in the upper chamber is greater than pressure in the reservoir.

20. An acceleration sensitive shock absorber as recited in claim 19 wherein the means for retaining the extension sleeve in the upper position comprises a downwardly and outwardly sloping passage through the extension sleeve.

21. An acceleration sensitive shock absorber as recited in claim 18 wherein the piston stroke is sufficient that the sealed piston passes the orifice through the upper sidewall before reaching the end of the extension stroke of the piston.

22. An acceleration sensitive shock absorber as recited in claim 18 wherein the orifice comprises a plurality of orifices through a sidewall of the inner tube at differing distances from the end of the tube.

23. An acceleration sensitive shock absorber as recited in claim 18 further comprising a spring biasing the extension sleeve upwardly for counteracting a portion of the weight of the extension sleeve.

24. An acceleration sensitive shock absorber as recited in claim 18 further comprising:

a compression sleeve surrounding the lower sidewall of the inner tube and movable between a lower position and an upper position;

a stop above the compression sleeve;

a spring biasing the compression sleeve upwardly for counteracting at least the weight of the compression sleeve and maintaining the compression sleeve against the stop in the absence of upward acceleration; and a passage through the compression sleeve positioned for non-alignment with the orifice through the lower sidewall when the compression sleeve is in the upper position and for alignment with the passage through the lower sidewall when the compression sleeve is in the lower position.

25. An acceleration sensitive shock absorber as recited in claim 12 further comprising means for biasing the movable sleeve toward a position with the orifice open in response to fluid flow through the orifice.

26. An acceleration sensitive shock absorber comprising:

a tube containing shock absorber fluid for connection to one portion of a vehicle;

a piston in the tube dividing the interior of the tube into an upper chamber and a lower chamber, for connection to another portion of a vehicle;

valve means for changing the stiffness of the shock absorber when the shock absorber is subjected to acceleration, the stiffness being greater upon lower acceleration and smaller upon higher acceleration; and means for closing the valve means before an end of the stroke of the piston in the tube for providing smaller stiffness in at least a mid-portion of the stroke and providing greater stiffness in an end portion of the stroke.

27. An acceleration sensitive shock absorber as recited in claim 26 wherein the valve means comprises an orifice through a sidewall of the tube spaced apart from an end of the tube a sufficient distance that the piston can pass the orifice before reaching the end of the stroke of the piston.

28. An acceleration sensitive shock absorber as recited in claim 27 wherein the orifice comprises a plurality of orifices through a sidewall of the inner tube at differing distances from the end of the tube.

* * * * *